United States Patent

Ueno et al.

[11] Patent Number: 4,953,414
[45] Date of Patent: Sep. 4, 1990

[54] OVERHANG-TYPE STARTER

[75] Inventors: Hirokazu Ueno; Hiroyuki Morikane, both of Hyogo, Japan

[73] Assignee: Mitsubishi Denki Kabushiki Kaisha, Tokyo, Japan

[21] Appl. No.: 344,571

[22] Filed: Apr. 28, 1989

[30] Foreign Application Priority Data

Jun. 3, 1988 [JP] Japan .................. 63-74439[U]

[51] Int. Cl.$^5$ ............................................ F02N 15/06
[52] U.S. Cl. ............................................ 74/6; 74/7 A; 290/38 C; 310/88; 384/624
[58] Field of Search ............... 74/6, 7 R, 7 A, 7 C, 74/7 E; 290/38 A, 38 C, 48; 310/88; 384/624

[56] References Cited

U.S. PATENT DOCUMENTS

| | | | |
|---|---|---|---|
| 4,404,533 | 9/1983 | Kurihara et al. | 335/131 |
| 4,440,033 | 4/1984 | Kurihara et al. | 74/7 A |
| 4,527,915 | 7/1985 | Ikariishi et al. | 384/480 |
| 4,613,761 | 9/1986 | Yabunaka | 290/36 R |
| 4,818,889 | 4/1989 | Kinoshita | 290/48 |
| 4,829,195 | 5/1989 | Takami | 290/48 |

Primary Examiner—Allan D. Herrmann
Attorney, Agent, or Firm—Sughrue, Mion, Zinn, Macpeak & Seas

[57] ABSTRACT

An overhang-type starter comprising a ball bearing fixedly fitted in a front bracket; a pinion drive shaft supported by the bearing; and a pinion formed on the shaft at the front end thereof so that the pinion is located in front of the bearing at least when the pinion is moved forward, wherein a water drain hole is provided in the ball bearing support portion of said bracket at the lowermost point of the portion and communicates with the interior of the bracket.

3 Claims, 1 Drawing Sheet

OVERHANG-TYPE STARTER

BACKGROUND OF THE INVENTION

The present invention relates to an overhang type starter, particularly to the water draining constitution thereof.

FIG. 3 shows a major part of a conventional overhang-type starter comprising a front bracket 1, a ball bearing 2 press fitted in the bearing support portion 1a of the front bracket, an opening 1b provided at a side of the ball bearing to keep it out of contact with the front bracket at the time of rotation of the rotary member of the bearing, a pinion drive shaft 3 supported by the ball bearing so as to be slidable in the axial direction of the shaft, a pinion 4 formed on the shaft at the front end thereof, a stopper 5 secured to an output rotary shaft 6 to limit the foremost position of the pinion, and an overrunning clutch 7 whose inner member is coupled to the pinion drive shaft and whose outer member is spline-fitted to the output rotary shaft. When the output rotary shaft 6 is rotated by an electric motor not shown in the drawing, the overrunning clutch 7 is moved forward by the actuator of an electromagnetic switch not shown in the drawing. As a result, the pinion drive shaft 3 is slid forward on the inside circumferential surface of the inner race of the ball bearing 2 while being rotated, so that the pinion 4 is engaged with the ring gear of an engine to start it. However, dirty water or the like comes into the starter through the gap between the pinion 4 and the front bracket 1 in some environment so as to stay in the opening 1b to adversely affect the rotation of the ball bearing 2 and cause rusting or the like. This is a problem.

SUMMARY OF THE INVENTION

The present invention was made in order to solve the above-mentioned problem.

Accordingly, it is an object of the present invention to provide an overhang-type starter of enhanced resistance to adverse environments. The starter comprises a ball bearing fixedly fitted in a front bracket; a pinion drive shaft supported by the bearing; and a pinion formed on the shaft at the front end thereof so that the pinion is located in front of the bearing at least when the pinion is moved forward The starter is characterized in that a water drain hole is provided in the ball bearing support portion of the front bracket at the lowermost point of the support portion, and water drain hole communicates with the interior of the front bracket. If water has come into the starter through the gap between the front bracket, and the pinion, the water does not stay in an opening at a side of the ball bearing but is drained through the water drain hole and a water drain passage which is provided in the starter. Since the water does not stay at the ball bearing portion, the bearing is prevented from rotating improperly or rusting due to the water. The resistance of the starter to adverse environment is thus enhanced.

DETAILED DESCRIPTION OF EXEMPLARY EMBODIMENT

An embodiment of the present invention is hereafter described in detail with reference to the drawings attached hereto.

Figure 1:
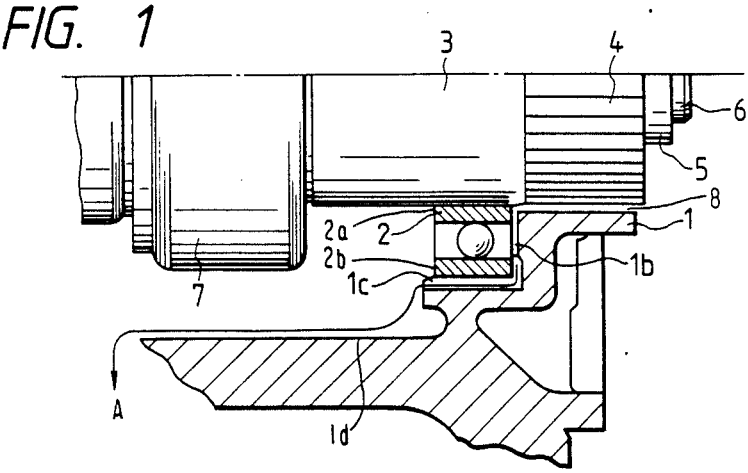
FIG. 1 a longitudinally sectional view of a major part of an overhang type starter which is an embodiment of the invention.
Figure 2:
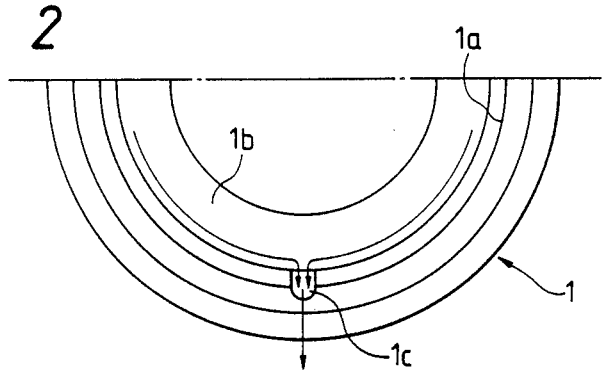
FIG. 2 shows a rear view of a major part of the front cover of the starter.
Figure 3:
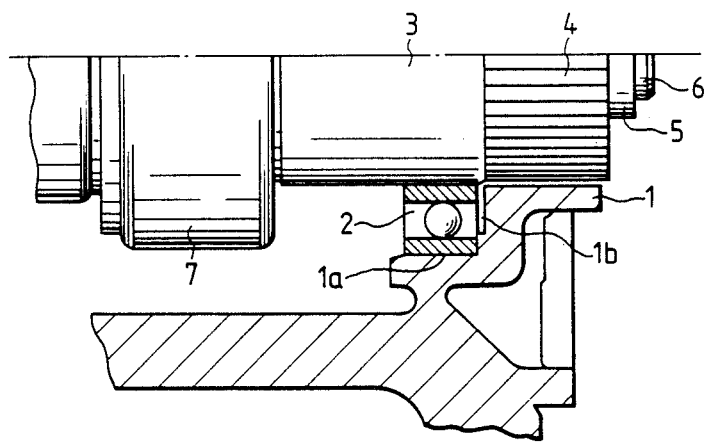
FIG. 3 shows a longitudinally sectional view of a major part of a conventional overhang-type starter.

FIGS. 1 and 2 show an overhang-type starter which is the embodiment. The starter comprises a front bracket 1, a ball bearing 2 having an upper and lower portion 2a, 2b, respectively press-fitted in the bearing support portion 1a of the front, an opening 1b provided at a side of the ball bearing to keep it out of contact with the front bracket at the time of rotation of the rotary member of the bearing, a pinion drive Shaft 3 supported by the ball bearing so as to be slidable in the axial direction of the shaft, a pinion 4 formed on the shaft at the front end thereof, a stopper 5 secured to an output rotary shaft 6 to limit the foremost position of the pinion. An overrunning clutch 7 is provided whose inner member is coupled to the pinion drive shaft and whose outer member is spline-fitted to the output rotary shaft. A water drain hole 1c is provided in the bearing support portion of the front bracket at the lowermost point of the portion, which connects the opening 1b to the interior 1d of the front bracket. If dirty water or the like has come into the opening 1b through the gap 8 which is between the front bracket 1 and the pinion 4 and which is in communication with the upper portion 2a of the bearing 2, the dirty water or the like gathers in the water drain hole 1c and then flows into the interior 1d of the front bracket as shown by arrows in FIG. 2, so that the dirty water or the like is drained out of the starter, as shown by an arrow A in -FIG. 1, through a water drain passage provided in the starter, similar to the water drain hole of a yoke not shown in the drawings.

The water drain hole 1c can be provided in the starter at the same time when the front bracket 1 is made of die-cast aluminum or the like. Therefore, a separate processing step of providing only the water drain hole 1c does not need to be taken in manufacturing the starter.

The present invention is not confined to the above-described embodiment, but may be practiced or embodied in other various ways without departing from the spirit or essential character thereof.

WHAT IS CLAIMED IS:

1. An overhang-type starter comprising:
   a front bracket having a substantially horizontal bearing support portion and an interior portion;
   a ball bearing structure fixedly fitted in said front bracket to said support portion and having an upper and lower portion;
   a pinion drive shaft supported by and moveable over said ball bearing structure;
   a pinion formed on said pinion drive shaft at the front end thereof, said pinion being moveable with said shaft, said pinion being disposed with respect to said front bracket such that a gap is formed in communication with said upper portion of said bearing structure; and
   a water drain hole provided in the bearing support portion of said front bracket at said lower portion of said ball bearing structure and a water drain passage that communicates between said hole and said interior portion of said front bracket.

2. An overhang-type starter as claimed in claim 1, wherein said front bracket comprises a rust-proof material.

3. An overhang-type starter as claimed in claim 1, wherein said front bracket comprises a die-cast material.

* * * * *